(12) United States Patent
Cai et al.

(10) Patent No.: US 8,942,687 B2
(45) Date of Patent: Jan. 27, 2015

(54) SELECTIVE CALL FORWARDING BASED ON THE LOCATION OF A MOBILE DEVICE

(75) Inventors: Yigang Cai, Naperville, IL (US);
Xiangyang Li, Beijing (CN)

(73) Assignee: Alcatel Lucent, Boulogne Billancourt (FR)

( * ) Notice: Subject to any disclaimer, the term of this patent is extended or adjusted under 35 U.S.C. 154(b) by 367 days.

(21) Appl. No.: 12/934,432

(22) PCT Filed: Apr. 8, 2008

(86) PCT No.: PCT/US2008/059623
§ 371 (c)(1),
(2), (4) Date: Sep. 24, 2010

(87) PCT Pub. No.: WO2009/126142
PCT Pub. Date: Oct. 15, 2009

(65) Prior Publication Data
US 2011/0059732 A1    Mar. 10, 2011

(51) Int. Cl.
*H04M 3/42* (2006.01)
*H04M 3/54* (2006.01)
*H04W 4/16* (2009.01)
*H04M 15/00* (2006.01)
*H04W 4/02* (2009.01)

(52) U.S. Cl.
CPC *H04M 3/54* (2013.01); *H04W 4/16* (2013.01); *H04M 3/42102* (2013.01); *H04M 3/42348* (2013.01); *H04M 15/00* (2013.01); *H04M 2203/1091* (2013.01); *H04M 2203/2094* (2013.01); *H04M 2242/30* (2013.01); *H04W 4/02* (2013.01)

USPC ...... 455/417; 455/405; 455/406; 455/407; 455/408; 455/409; 455/414.1; 455/445; 379/211.01; 379/211.02; 379/212.01; 379/215.01

(58) Field of Classification Search
CPC ......... H04M 3/54; H04M 2203/1091; H04M 3/42263; H04M 15/41; H04M 2215/32; H04M 2215/0164; H04M 2215/2026; H04W 4/16; H04W 4/24; H04W 76/02
USPC ...... 455/445, 456, 414.1, 417, 435.2, 436, 455/440, 405–409, 456.1; 379/211.01, 379/211.02, 212.01, 215.01
See application file for complete search history.

(56) References Cited

U.S. PATENT DOCUMENTS

| | | | | |
|---|---|---|---|---|
| 6,038,451 | A * | 3/2000 | Syed et al. | 455/445 |
| 6,044,261 | A * | 3/2000 | Kazmi | 455/408 |
| 6,201,957 | B1 * | 3/2001 | Son et al. | 455/406 |
| 6,208,854 | B1 * | 3/2001 | Roberts et al. | 455/417 |
| 6,230,006 | B1 * | 5/2001 | Keenan et al. | 455/424 |
| 6,519,454 | B1 * | 2/2003 | Calabrese et al. | 455/432.1 |

(Continued)

*Primary Examiner* — Olumide T Ajibade Akonai
(74) *Attorney, Agent, or Firm* — Duft Bornsen Fettig, LLP

(57) ABSTRACT

Communication networks and methods are disclosed for selectively applying call forwarding between a mobile device and a fixed line device based on the location of the mobile device. A communication network includes a call control function that receives a call attempt to a mobile directory number. Responsive to the call attempt, the call control function identifies a location of the mobile device, and determines whether to apply call forwarding based on the location of the mobile device. If call forwarding is applied, then the call control function forwards the call attempt to the fixed line device instead of the mobile device. A similar process is performed for a call attempt to the fixed line device for forwarding the call to the mobile device.

16 Claims, 7 Drawing Sheets

(56) References Cited

U.S. PATENT DOCUMENTS

| | | | |
|---|---|---|---|
| 6,671,506 B1 * | 12/2003 | Lee | 455/406 |
| 6,701,145 B2 * | 3/2004 | Payne et al. | 455/417 |
| 6,775,546 B1 * | 8/2004 | Fuller | 455/445 |
| 6,853,718 B1 * | 2/2005 | Bedingfield et al. | 379/212.01 |
| 7,106,848 B1 * | 9/2006 | Barlow et al. | 379/212.01 |
| 7,376,411 B2 * | 5/2008 | Thommana et al. | 455/405 |
| 7,443,972 B1 * | 10/2008 | Barlow et al. | 379/212.01 |
| 7,715,790 B1 * | 5/2010 | Kennedy | 455/41.2 |
| 7,903,799 B1 * | 3/2011 | Ganesan et al. | 379/201.02 |
| 2002/0181398 A1 * | 12/2002 | Szlam | 370/230 |
| 2003/0100319 A1 | 5/2003 | Contractor | |
| 2005/0063528 A1 * | 3/2005 | Pearson et al. | 379/211.01 |
| 2007/0036098 A1 * | 2/2007 | Jain et al. | 370/328 |

* cited by examiner

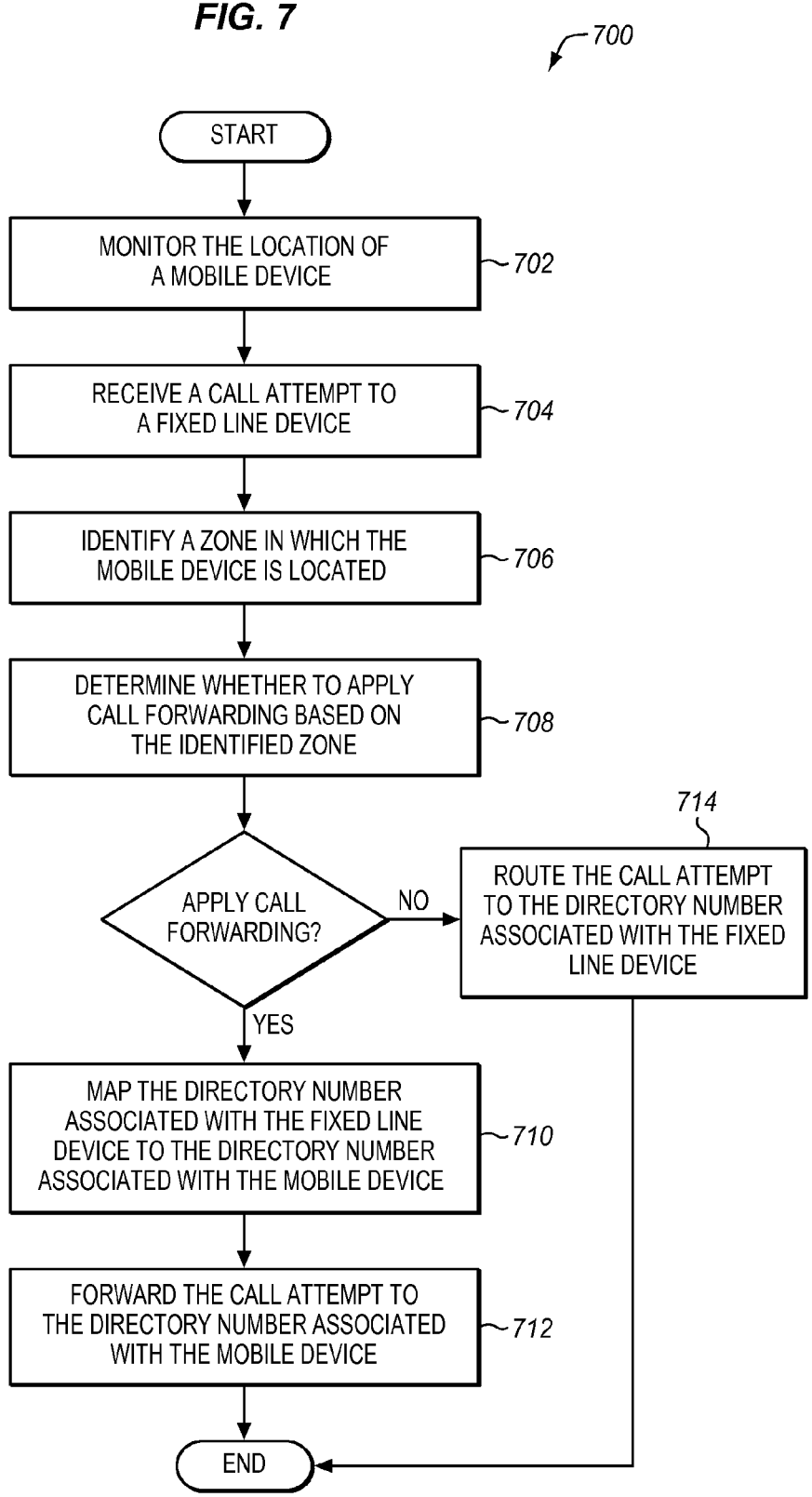

SELECTIVE CALL FORWARDING BASED ON THE LOCATION OF A MOBILE DEVICE

Related Applications

This application is the National Stage under 35 U.S.C. 371 of International Application No. PCT/US08/59623, filed Apr. 8, 2008, which is incorporated by reference herein.

BACKGROUND OF THE INVENTION

1. Field of the Invention

The invention is related to the field of communication networks, and in particular, to applying selective call forwarding between a mobile device and a fixed line device based on the location of the mobile device.

2. Statement of the Problem

Service providers typically provide numerous voice and/or data services to subscribers using one or more wireline and/or wireless communication networks. Exemplary services include cellular telephony, access to the Internet, gaming, broadcasting or multicasting of audio, video, and multimedia programming, etc. Mobile devices, such as cell phones, personal data assistants, smart phones, pagers, text messaging devices, global positioning system (GPS) devices, network interface cards, notebook computers, and desktop computers, may access the services provided by the communication network over an air interface with one or more base stations. Communication between the mobile devices and the base stations are governed by various standards and/or protocols, such as the standards and protocols defined by the 3rd Generation Partnership Project (3GPP/3GPP2).

The service providers also provide supplementary services to users. One type of supplementary service is call forwarding. Call forwarding (or call diverting) is a feature or service that allows an incoming call to one directory number to be redirected to another directory number. In a typical communication network, a switch or other call control function receives a call attempt to a first directory number. The switch identifies that a call forwarding service has been activated for the first directory number. When the call forwarding service has been activated, the switch may forward the call immediately to a second directory number. Alternatively, the switch may attempt to connect the call to the first directory number, and then forward the call to the second directory number if the first directory number is busy or if the call is not answered at the first directory number after a certain time period (i.e., after two rings).

One problem with present call forwarding services is that there is not much flexibility in how call forwarding is applied. For instance, a user subscribing to a call forwarding service may define a directory number from which calls are forwarded, a directory number to which the calls are forwarded, and one or more calling party directory numbers that trigger the call forwarding service. Other than defining these directory numbers, a user subscribing to a call forwarding service has few or no other options for defining how the call forwarding service is applied. There may be instances where it is advantageous to perform the call forwarding service selectively, such as based on the location of a mobile device. Present communication networks do not allow for such selective applications of the call forwarding service.

SUMMARY OF THE SOLUTION

Embodiments of the invention solve the above and other related problems by selectively applying call forwarding to redirect calls between a fixed line device and a mobile device based on the location of the mobile device. For instance, if the mobile device is located in the vicinity of the fixed line device, then call forwarding may be applied from the mobile device to the fixed line device, or vice versa. However, if the mobile device is not located in the vicinity of the fixed line device, then call forwarding may not be applied. Selective call forwarding advantageously provides flexibility into how the call forwarding service is applied. Selective call forwarding may also advantageously allow for flexibility in how a forwarded call is charged, as the call may be charged based on a mobile tariff, a One embodiment of the invention comprises a communication network operable to provide selective call forwarding between a mobile device and a fixed line device when a call attempt is made to the mobile device. The communication network includes a call control function, such as a switch, a Mobile Switching Center (MSC), etc. The call control function is operable to receive the call attempt to a directory number associated with the mobile device. Responsive to the call attempt, the call control function is further operable to identify a location of the mobile device, and to determine whether to apply call forwarding based on the location of the mobile device. If the determination is to apply call forwarding, then the call control function is further operable to map the directory number associated with the mobile device to a directory number associated with the fixed line device, and to forward the call attempt to the directory number associated with the fixed line device. Thus, this and other call attempts to the mobile device are forwarded to the fixed line device depending on the location of the mobile device.

Another embodiment of the invention comprises the communication network operable to provide selective call forwarding between a mobile device and a fixed line device when a call attempt is made to the fixed line device. The call control function is operable to receive the call attempt to the directory number associated with the fixed line device. Responsive to the call attempt, the call control function is further operable to identify a location of the mobile device, and to determine whether to apply call forwarding based on the location of the mobile device. If the determination is to apply call forwarding, then the call control function is further operable to map the directory number associated with the fixed line device to a directory number associated with the mobile device, and to forward the call attempt to the directory number associated with the mobile device. Thus, this and other call attempts to the fixed line device are forwarded to the mobile device depending on the location of the mobile device.

When a call is forwarded from the mobile device to the fixed line device, or vice versa, the call control function may be further operable to apply charging for the call in a variety of ways. For example, a forwarded call may be charged based on the fixed line tariff or a modified fixed line tariff, or may be charged based on the mobile tariff or a modified mobile tariff. Alternatively, the forwarded call may be charged based on a combination of a fixed line tariff and a mobile tariff.

The invention may include other exemplary embodiments described below.

DESCRIPTION OF THE DRAWINGS

The same reference number represents the same element or same type of element on all drawings.

FIG. 7 is a flow chart illustrating a method of selectively applying a call forwarding service for a call destined for a fixed line device in an exemplary embodiment of the invention.

DETAILED DESCRIPTION OF THE INVENTION

FIGS. 1-7 and the following description depict specific exemplary embodiments of the invention to teach those skilled in the art how to make and use the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Figure 1:
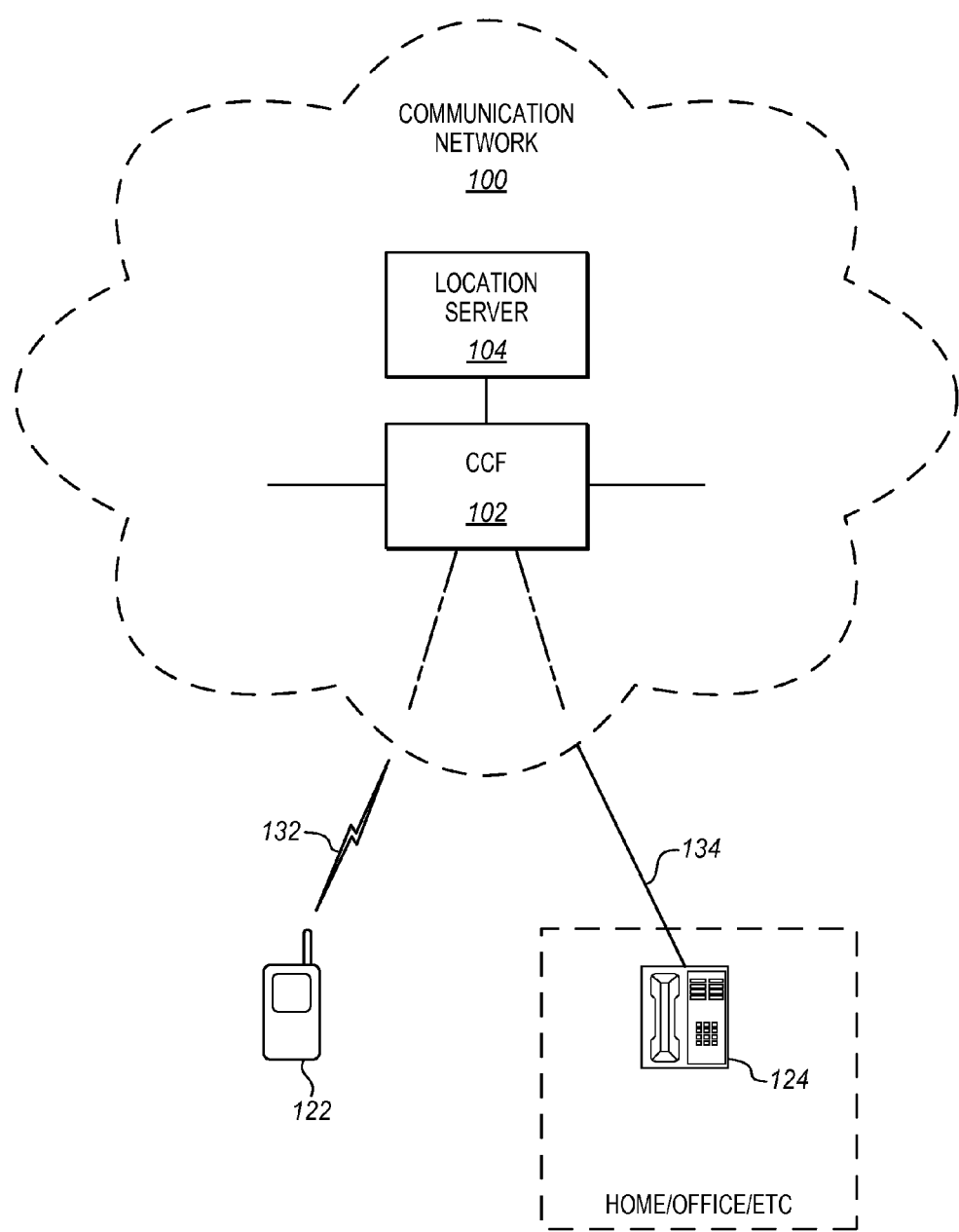
FIG. 1 illustrates a communication network in an exemplary embodiment of the invention.

FIG. 1 illustrates a communication network 100 in an exemplary embodiment of the invention. Communication network 100 includes a call control function (CCF) 102 and a location server 104. Call control function 102 comprises any system, server, switch, or other component operable to serve a call, such as to set up, maintain, or tear down a call. Call control function 102 may be used to serve a mobile device 122 or a fixed line device 124 for a call. For instance, if call control function 102 serves mobile device 122, then call control function 102 may comprise a Mobile Switching Center (MSC). If call control function 102 serves fixed line device 124, then call control function 102 may comprise a switch, such as a 5ESS switch. A mobile device 122 comprises a portable device used for mobile communication, such as a cellular phone. Mobile device 122 communicates with communication network 100 over the air interface 132, such as by communicating with one or more base stations via wireless signals. A fixed line device 124 comprises a device that uses a wired phone line for communication. Fixed line device 124 communicates with communication network 100 over a wired phone connection 134, such as by connecting to a central office of a phone company.

Location server 104 comprises any system, server, or other component operable to monitor the location of mobile device 122 and other mobile devices. Location server 104 may represent a subscriber database, such as a Home Location Register (HLR) or a Home subscriber Server (HSS). Location server 104 may be controlled by the service provider operating communication network 100, or may be controlled by a third party.

Communication network 100 is able to provide a call forwarding service that allows for call forwarding between a mobile device 122 and a fixed line device 124 to be selectively applied based on the location of mobile device 122. Assume for this embodiment that mobile device 122 and fixed line device 124 have some type of association. For instance, they may both belong to a user that subscribes to the call forwarding service. Mobile device 122 may comprise the cell phone of the user, while the fixed line device 124 may comprise the home phone, office phone, etc, of the user. The user may define that calls directed to mobile device 122 will be forwarded to fixed line device 124, or vice versa. The call forwarding service may then be selectively applied as described below.

Figure 2:
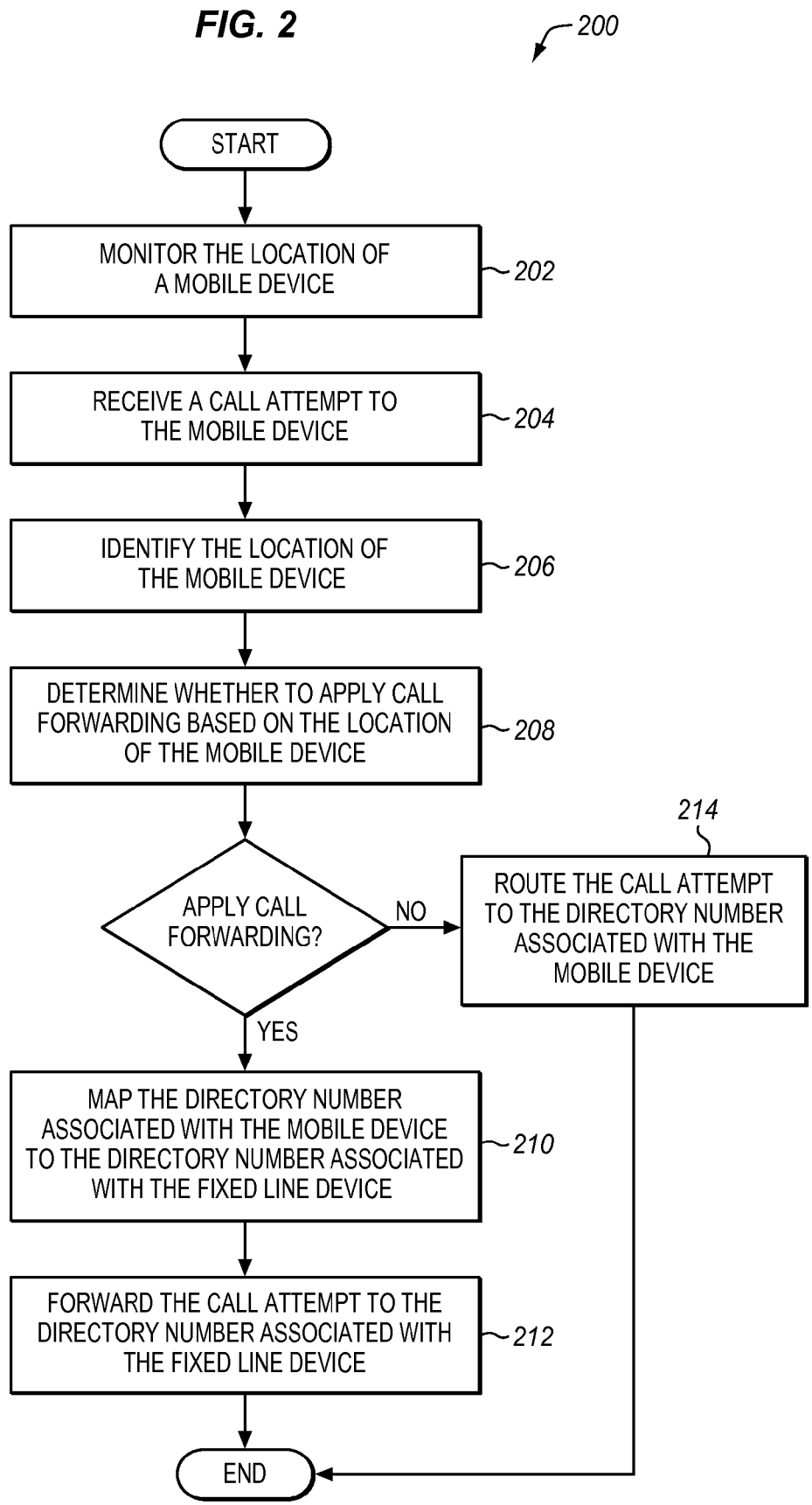
FIG. 2 is a flow chart illustrating a method of selectively applying a call forwarding service for a call destined for a mobile device in an exemplary embodiment of the invention.

FIG. 2 is a flow chart illustrating a method 200 of selectively applying a call forwarding service for a call destined for mobile device 122 in an exemplary embodiment of the invention. The steps of method 200 will be described with reference to communication network 100 in FIG. 1, although the method may be performed by other types of communication networks. The steps of the flow chart in FIG. 2 are not all inclusive and may include other steps not shown.

In step 202, location server 104 monitors the location of one or more mobile devices 122 in communication network 100. The location of mobile devices may be monitored in a variety of ways. In one embodiment, mobile device 122 may include Global Positioning System (GPS) functionality to report the location of mobile device 122 to location server 104. In another embodiment, location server 104 may use triangulation or other means to actively determine the location of mobile device 122. Location server 104 may map the location of mobile devices to other identifying information for the device, such as the directory number assigned to the mobile device.

In addition to monitoring the location of mobile device 122, location server 104 may know or identify the location of fixed line device 124. Fixed line device 124 is connected to a telephone jack. The telephone jack has associated location information, such as a street address or GPS coordinates. The telephone jack also has an associated directory number. The service provider or another third party provider maintains a database that maps directory numbers to locations for each of the telephone jacks. As a result, the location of each fixed-line device 124 can be easily determined, which is advantageous for purposes such as emergency services (i.e., 9-1-1).

In step 204, call control function 102 receives a call attempt to a directory number associated with mobile device 122. Responsive to receiving the call attempt (i.e., signaling to initiate a call), call control function 102 retrieves a subscriber profile that is associated with the directory number for mobile device 122. Call control function 102 processes the subscriber profile to identify a call forwarding indication for forwarding the call. The call forwarding indication in the subscriber profile indicates that call forwarding has been activated for this directory number. More particularly, the subscriber profile indicates that calls to mobile device 122 should be forwarded to the directory number of fixed line device 124.

In this embodiment, call forwarding is selectively applied based on the location of mobile device 122. Thus, call control function 102 identifies the location for mobile device 122 in step 206. To identify the location for mobile device 122, call control function 102 may query location server 104 with a directory number for mobile device 122 or another identifier for mobile device 122. Responsive to the query, location sever 104 may transmit location information for mobile device 122 to call control function 102. The location information may comprise GPS coordinates, a street address, or other location information. Call control function 102 may also query location server 104 for location information for fixed line device 124.

Based on the location of mobile device 122, call control function 102 determines whether to apply call forwarding in step 208. For example, call control function 102 may process location criteria in step 208 to determine whether or not to apply call forwarding. The location criteria may include the distance between mobile device 122 and fixed line device 124. Thus, call control function 102 may determine if the location of mobile device 122 is within a threshold distance of the location of fixed line device 124 (i.e., within a proximity or vicinity of fixed line device 124), and apply call forwarding if the location of mobile device 122 is within the threshold distance. The location criteria may alternatively include the location of mobile device 122 in relation to zones predefined by the service provider. Thus, call control function 102 may determine if the location of mobile device 122 is located within a particular zone predefined by the service provider as corresponding with fixed line device 124, and apply call forwarding if the location of mobile device 122 is within the particular zone.

If a determination is made to apply call forwarding, then call control function 102 maps the directory number associated with mobile device 122 to the directory number associated with fixed line device 124 in step 210. In step 212, call control function 102 forwards the call attempt to the directory number associated with the fixed line device 124. Thus, due to the location of mobile device 122, the call to mobile device 122 is forwarded to fixed line device 124 instead of being routed to mobile device 122.

If a determination is made not to apply call forwarding, then call control function 102 forwards the call attempt to the directory number associated with mobile device 122 in step 214. In other words, the call attempt is routed to the original dialed number for the call instead of being forwarded to another number.

Figure 3:
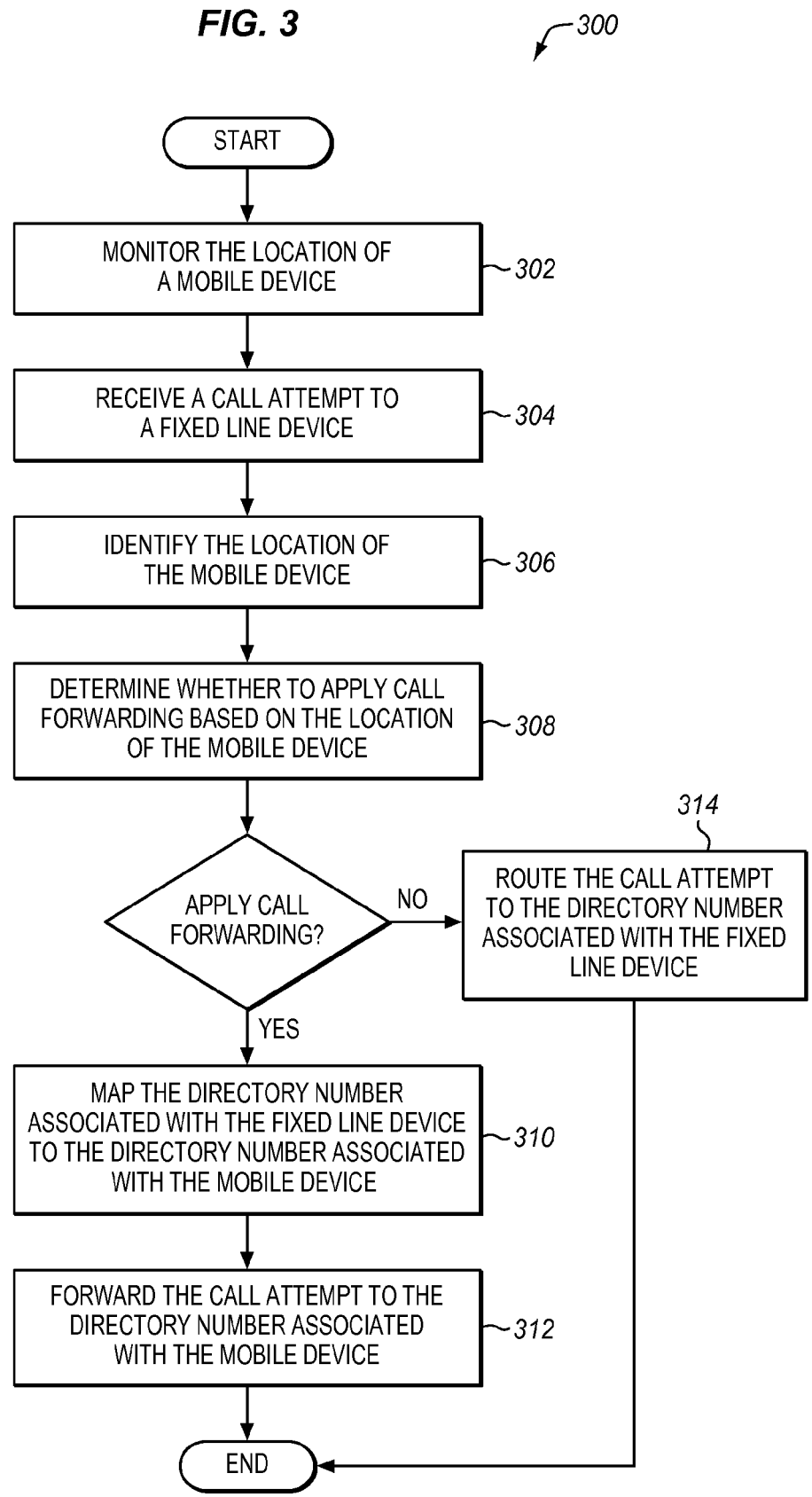
FIG. 3 is a flow chart illustrating a method of selectively applying a call forwarding service for a call destined for a fixed line device in an exemplary embodiment of the invention.

A similar method is performed for a call attempt to fixed line number 124 as described in FIG. 3. FIG. 3 is a flow chart illustrating a method 300 of selectively applying a call forwarding service for a call destined for fixed line device 124 in an exemplary embodiment of the invention. The steps of method 300 will be described with reference to communication network 100 in FIG. 1, although the method may be performed by other types of communication networks. The steps of the flow chart in FIG. 3 are not all inclusive and may include other steps not shown.

In step 302, location server 104 monitors the location of mobile device 122 in communication network 100. In step 304, call control function 102 receives a call attempt to the directory number associated with fixed line device 124. Responsive to receiving the call attempt (i.e., signaling to initiate a call), call control function 102 retrieves a subscriber profile that is associated with the directory number for fixed line device 124. Call control function 102 processes the subscriber profile to identify a call forwarding indication for forwarding the call. The call forwarding indication in the subscriber profile indicates that call forwarding has been activated for this directory number. More particularly, the subscriber profile indicates that calls to fixed line device 124 should be forwarded to the directory number of mobile device 122.

In this embodiment, call forwarding is selectively applied based on the location of mobile device 122. Thus, call control function 102 identifies the location of mobile device 122 in step 306. Based on the location of mobile device 122, call control function 102 determines whether to apply call forwarding in step 308. If a determination is made to apply call forwarding, then call control function 102 maps the directory number associated with fixed line device 124 to the directory number associated with mobile device 122 in step 310. In step 312, call control function 102 forwards the call attempt to the directory number associated with the mobile device 122. Thus, due to the location of mobile device 122, the call to fixed line device 124 is forwarded to mobile device 122 instead of being routed to fixed line device 124. If a determination is made not to apply call forwarding, then call control function 102 forwards the call attempt to the directory number associated with fixed line device 124 in step 314.

When a call is forwarded from mobile device 122 to fixed line device 124, or vice versa, call control function 102 may apply charging for the call in a variety of ways. To apply charging, call control function 102 may identify a tariff defined for the location of mobile device 122, and charge for the call based on the identified tariff. For example, a forwarded call may be charged based on the fixed line tariff or a modified fixed line tariff, or may be charged based on the mobile tariff or a modified mobile tariff. Thus, the forwarded call can be charged in a flexible manner to benefit the subscriber and/or the service provider. For instance, if a call is forwarded from mobile device 122 to fixed line device 124, then the application of a fixed line tariff for the call is typically advantageous to the subscriber as the fixed line tariff is typically less than the mobile tariff.

Alternatively, the forwarded call may be charged based on a combination of a modified fixed line tariff and a modified mobile tariff. That way charging for the call will be spread across both directory numbers.

When implementing the selective call forwarding service, the service provider may divide a service area into zones. Call forwarding may be selectively applied based on which zone a mobile device is located in. Zone-based call forwarding is described in FIGS. 4-7.

Figure 4:
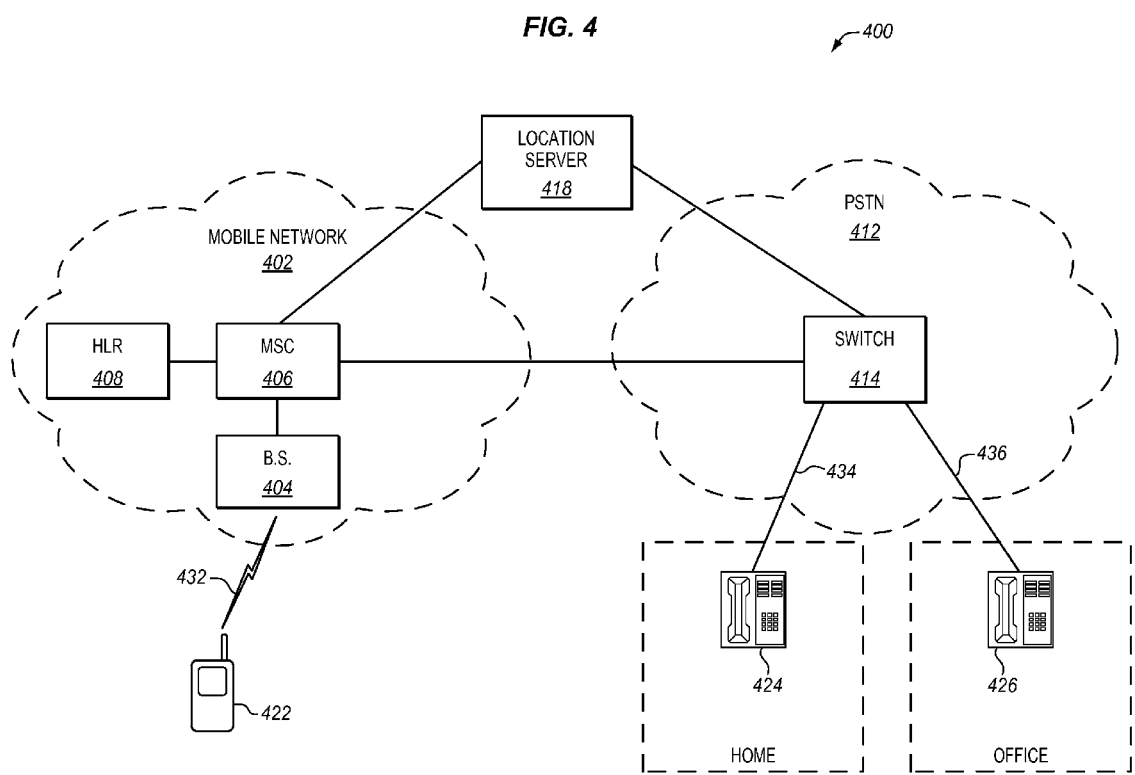
FIG. 4 illustrates a communication network in an exemplary embodiment of the invention.

FIG. 4 illustrates a communication network 400 in an exemplary embodiment of the invention. Communication network 400 includes a mobile network 402, a Public Switched Telephone Network (PSTN) 412, and a location server 418. Mobile network 402 comprises any network operable to communicate with one or more mobile devices 422 over the air interface 432. Mobile network 402 may comprise a UTRAN network, a CDMA network, a GSM network, a UMTS network, a WiFi/WiMAX network, etc. Mobile network 402 includes one or more base stations 404 that are operable to communicate with mobile devices 422 via wireless signals. Mobile network 402 further includes one or more Mobile Switching Centers (MSC) 406, and a Home Location Register (HLR) 408. Mobile network 402 may include other network elements that are left out for the sake of brevity.

PSTN 412 comprises any circuit-switched network operable to provide fixed line communications to homes, business, etc. PSTN 412 includes one or more switches 414. Switch 414 is operable to serve multiple fixed lines, one of which is fixed line 434 that is connected to fixed line device 424. Another one is fixed line 436 that is connected to fixed line device 426. Fixed line device 424 is illustrated as being in a home of a subscriber, and fixed line device 426 is illustrated as being in an office of the subscriber. The locations of devices 424 and 426 are merely illustrations, and they may be located in a variety of other locations.

The base stations 404 in mobile network 402 define the service or coverage area for the mobile portion of communication network 400. The service provider operating communication network 400 may segment some or all of the service area into a plurality of zones. A zone comprises an area or location defined by a service provider as being distinct from other areas or locations.

Figure 5:
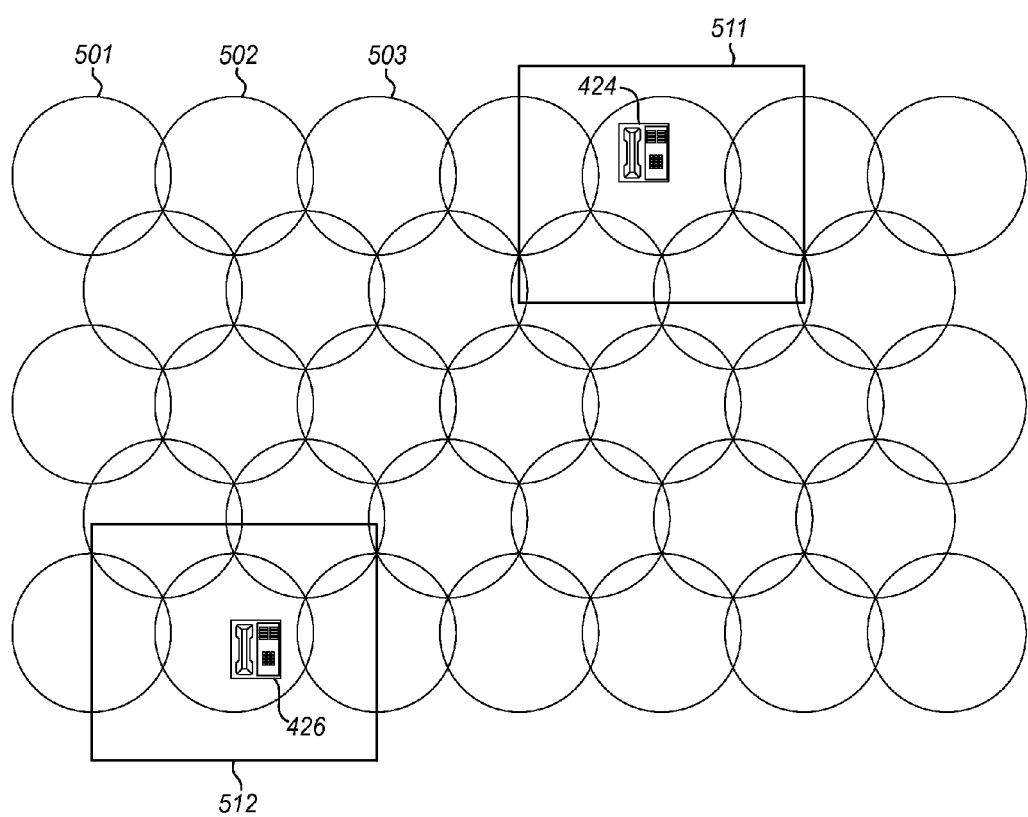
FIG. 5 illustrates a service area of a mobile network in an exemplary embodiment of the invention.

FIG. 5 illustrates a service area 500 of mobile network 402 in an exemplary embodiment of the invention. Service area 500 is defined by a plurality of cells 501-503 formed from the base stations of mobile network 402. Within service area 500, the service provider and/or the subscriber may define one or more zones 511-512. A zone may be defined as an area or a boundary surrounding a fixed line device of a subscriber or in the vicinity of the fixed line device. Thus, a home zone may represent the area surrounding a home phone of a subscriber. An office zone may represent the area surrounding an office phone of a subscriber. The zones 511-512 and other zones not shown in FIG. 5 may be defined in a variety of ways by the service provider and/or a subscriber to a call forwarding service. When the zones are defined, call forwarding and the charging associated with forwarded calls may be applied differently based on which zone a mobile device of the subscriber is located in.

Assume for this embodiment that the service provider and/or the subscriber have defined zone 511 as a home zone. Home zone 511 corresponds with the location of fixed line phone 424, which is in the home of the subscriber. The service provider and/or the subscriber have defined zone 512 as an office zone. Office zone 512 corresponds with the location of fixed line phone 426, which is in the office of the subscriber. There may be many more zones defined for the subscriber as desired.

After the zones are defined, the service provider and/or the subscriber may further define a profile for each zone. The zone profile may indicate a variety of parameters for implementing a call forwarding service. One parameter may be the fixed line directory number for call forwarding as defined for a zone. For example, the zone profile for home zone 511 may include the directory number for fixed line device 424 so that calls to mobile device 422 may be forwarded to device 424, or vice-versa, when mobile device 422 is in home zone 511. Another parameter may be the class of service for the subscriber. Another parameter may be the tariff plan for the zone. For example, the zone profile for home zone 511 may include a tariff plan indicating that calls forwarded from mobile device 422 or to mobile device 422 will be charged based on the tariff for fixed line device 424. Another parameter may be a type of notification that will be transmitted to mobile device 422 when a call is forwarded to a fixed line number (or another mobile number).

Figure 6:
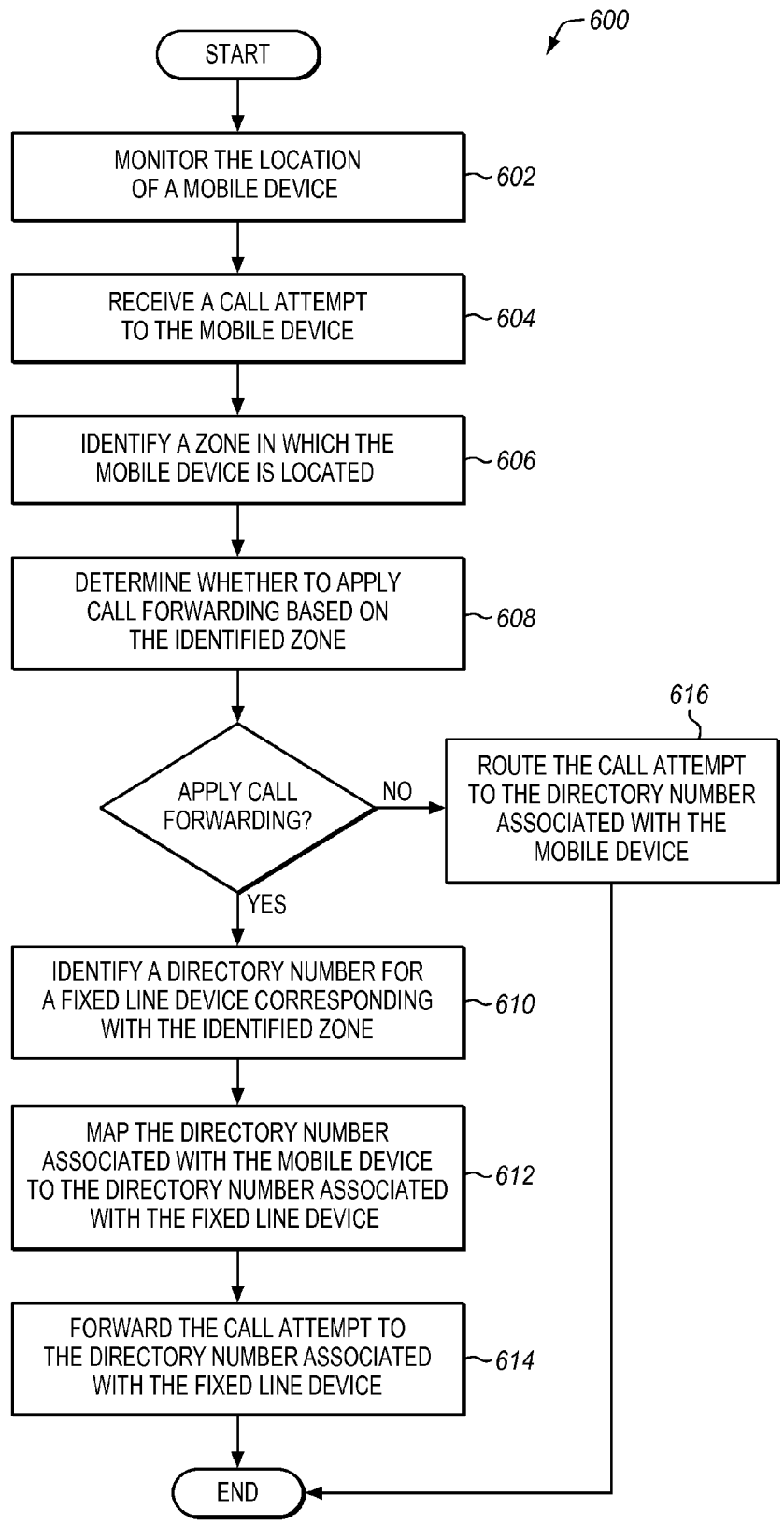
FIG. 6 is a flow chart illustrating a method of selectively applying a call forwarding service for a call destined for a mobile device in an exemplary embodiment of the invention.

FIG. 6 is a flow chart illustrating a method 600 of selectively applying a call forwarding service for a call destined for mobile device 422 in an exemplary embodiment of the invention. The steps of method 600 will be described with reference to communication network 400 in FIG. 4, although the method may be performed by other types of communication networks. The steps of the flow chart in FIG. 6 are not all inclusive and may include other steps not shown.

In step 602, location server 418 monitors the location of mobile device 422 in communication network 400. To monitor the location of mobile device 422, location server 418 may determine the present cell ID/sector ID of mobile device 422. Based on the present location information (e.g., cell ID/sector ID) for mobile device 422, location server 418 is able to determine which zone mobile device 422 is located in. Location server 418 may include a list or a data structure indicating how the zones are defined according to cell ID/sector ID. Based on the present cell ID/sector ID, location server 418 is able to determine in which zone the mobile device 422 is presently located.

In step 604, MSC 406 receives a call attempt to a directory number associated with mobile device 422. Responsive to receiving the call attempt (i.e., signaling to initiate a call), MSC 406 retrieves a subscriber profile that is associated with the directory number for mobile device 422 from HLR 408. MSC 406 processes the subscriber profile to identify a call forwarding indication for forwarding the call. The call forwarding indication in the subscriber profile indicates that call forwarding has been activated for this directory number. Also, the subscriber profile may further include the zone profile or profiles created for the subscriber. The zone profiles, in this embodiment, indicate that calls to mobile device 422 should be forwarded to the directory number of fixed line device 424 when mobile device 422 is in zone 511, and should be forwarded to the directory number of fixed line device 426 when mobile device 422 is in zone 512 (see FIG. 5).

In this embodiment, call forwarding is selectively applied based on which zone mobile device 422 is located in. Thus, MSC 406 identifies the zone in which mobile device 422 is located (if any) in step 606. In step 608, MSC 406 determines whether to apply call forwarding based on the identified zone. For example, if mobile device 422 is located in zone 511 (see FIG. 5), then call forwarding may be applied to the directory number of fixed line device 424. If mobile device 422 is located in zone 512 (see FIG. 5), then call forwarding may be applied to the directory number of fixed line device 426. If mobile device 422 is located in another zone, then call forwarding may be applied to other directory numbers or may be rejected.

If a determination is made to apply call forwarding, then MSC 406 identifies a directory number for a fixed line device corresponding with the identified zone in which mobile device 422 is located in step 610. To identify the directory number, MSC 406 may process the zone profile for the identified zone. The zone profile indicates one or more directory numbers that are eligible for call forwarding while mobile device 422 is located in that zone. Although the directory numbers are described as belonging to fixed line devices, one or more directory numbers may belong to other mobile devices.

In step 612, MSC 406 maps the directory number associated with mobile device 422 to the identified directory number associated with a fixed line device. In step 614, MSC 406 forwards the call to the directory number associated with the fixed line device. For instance, if the identified directory number is the directory number for fixed line device 424, then MSC 406 forwards the call attempt to the directory number for fixed line device 424.

If a determination is made not to apply call forwarding, then MSC 406 forwards the call attempt to the directory number associated with mobile device 422 in step 616. In other words, the call attempt is routed to the original dialed number for the call instead of being forwarded to another number.

A similar method is performed for a call attempt to fixed line device 424 or fixed line device 426 as described in FIG. 7. FIG. 7 is a flow chart illustrating a method 700 of selectively applying a call forwarding service for a call destined for fixed line device 424 in an exemplary embodiment of the invention. The steps of method 700 will be described with reference to communication network 400 in FIG. 4, although the method may be performed by other types of communication networks. The steps of the flow chart in FIG. 7 are not all inclusive and may include other steps not shown.

In step 702, location server 418 monitors the location of mobile device 422 in communication network 400. In step 704, switch 414 receives a call attempt to the directory number associated with fixed line device 424. Responsive to receiving the call attempt (i.e., signaling to initiate a call), switch 414 retrieves a subscriber profile that is associated with the directory number for fixed line device 424. Switch 414 processes the subscriber profile to identify a call forwarding indication for forwarding the call. The call forwarding indication in the subscriber profile indicates that call forwarding has been activated for this directory number. Also, the subscriber profile may further include the zone profile or profiles created for the subscriber. The zone profiles, in this embodiment, indicate that calls to fixed line device 424 should be forwarded to the directory number of mobile device 424 when mobile device 422 is in zone 511.

In this embodiment, call forwarding is selectively applied based on which zone mobile device 422 is located in. Thus, switch 414 identifies the location of mobile device 422 in step 706. In step 708, switch 414 determines whether to apply call forwarding based on the identified zone. For example, if mobile device 422 is located in zone 511 (see FIG. 5), then call forwarding may be applied to the directory number of mobile device 422. If mobile device 422 is not located in zone 511 (see FIG. 5), then call forwarding may be rejected.

If a determination is made to apply call forwarding, then switch 414 maps the directory number associated with fixed line device 424 to the directory number associated with mobile device 422 in step 710. In step 712, switch 414 forwards the call attempt to the directory number associated with the mobile device 422. Thus, due to the location of mobile device 422, calls to fixed line device 424 are forwarded to mobile device 422 instead of being routed to fixed line device 424. If a determination is made not to apply call forwarding, then switch 414 forwards the call to the directory number associated with fixed line device 424 in step 714. There would be no call forwarding in that instance.

When a call is forwarded from mobile device 422 to fixed line device 424 or 426, or vice versa, MSC 406 or switch 414 may apply charging for the call in a variety of ways. MSC 406 or switch 414 may identify a tariff defined for the zone in which mobile device 422 is presently located, and may charge for the call based on the identified tariff. For example, a forwarded call may be charged based on the fixed line tariff or a modified fixed line tariff, or may be charged based on the mobile tariff or a modified mobile tariff. Alternatively, the forwarded call may be charged based on a combination of a modified fixed line tariff and a modified mobile tariff.

Other considerations for charging may be whether mobile device 422 moves into or out of a zone. In such a circumstance, there may be a tariff change or no tariff change. For example, assume that a call initiates in office zone 512, and charging is applied to the directory number for fixed line device 426 (see FIG. 5). If mobile device 422 moves out of office zone 512 when the call is in progress, then charging may be switched over to the directory number for mobile device 422. If mobile device 422 moves out office zone 512 into home zone 511 when the call is in progress, then charging may be switched over to the directory number for mobile device 422 and then over to the directory number for fixed line device 424.

MSC 406 or switch 414 may wait to change the tariff for a call if mobile device 422 moves to a boundary zone or a neighboring zone. Because a move from a home zone 511 to an office zone 512 may comprise a small movement (see FIG. 5), such as less than a mile, MSC 406 or switch 414 may determine that a change to a tariff may not be desirable, as mobile device 422 may quickly return to home zone 511. If mobile device 422 remains in the office zone 512, and then MSC 406 or switch 414 may change the tariff for the call after a threshold time period.

When a tariff has changed as described above, MSC 406 may send a notification to mobile device 422 indicating the zone occupied by mobile device 422 and the tariff that is being charged for the call. For example, when mobile device 422 enters office zone 512, MSC 406 may provide an announcement such as "you are entering your office zone and your incoming calls and outgoing calls will be charged to your office number". This notification may be sent via a voice message, a text message, etc.

Although specific embodiments were described herein, the scope of the invention is not limited to those specific embodiments. The scope of the invention is defined by the following claims and any equivalents thereof.

We claim:

1. A system comprising:
   a call control function operable to receive a call attempt to a first directory number associated with a fixed line device of a user, to identify a location of a mobile device of the user, to determine whether to apply call forwarding from the fixed line device to the mobile device based on the location of the mobile device, and to forward the call attempt to a second directory number associated with the mobile device of the end user responsive to a determination that call forwarding applies;
   the call control function is further operable to identify a fixed line tariff for the call, to identify a mobile tariff for the call, and to initiate charging for the call based on a combination of the fixed line tariff and the mobile tariff to spread charging across both directory numbers.

2. The system of claim 1 wherein:
   the call control function is further operable to route the call attempt to the first directory number responsive to a determination not to apply call forwarding.

3. The system of claim 1 wherein:
   the call control function is further operable to determine if the location of the mobile device is within a threshold distance of a location of the fixed line device.

4. The system of claim 1 wherein:
   the call control function is further operable to determine if the location of the mobile device is within a zone predefined by the service provider as corresponding with the fixed line device.

5. The system of claim 4 wherein:
   the zone predefined by the service provider comprises a home zone representing an area surrounding a home phone of the user.

6. The system of claim 1 wherein:
   the call control function is further operable to initiate charging for the call based on the mobile tariff.

7. The system of claim 1 wherein:
   the call control function is further operable to initiate charging for the call based on the fixed line tariff.

8. A method comprising:
   receiving a call attempt to a first directory number associated with a fixed line device of a user;
   identifying a location of a mobile device of the user;
   determining whether to apply call forwarding from the fixed line device to the mobile device based on the location of the mobile device;
   forwarding the call attempt to a second directory number associated with the mobile device of the end user responsive to a determination that call forwarding applies;
   identifying a fixed line tariff for the call;
   identifying a mobile tariff for the call; and
   initiating charging for the call based on a combination of the fixed line tariff and the mobile tariff to spread charging across both directory numbers.

9. The method of claim 8 further comprising:
routing the call attempt to the first directory number responsive to a determination not to apply call forwarding.

10. The method of claim 8 wherein determining whether to apply call forwarding based on the location of the mobile device further comprises:
determining if the location of the mobile device is within a threshold distance of a location of the fixed line device.

11. The method of claim 8 wherein determining whether to apply call forwarding based on the location of the mobile device further comprises:
determining if the location of the mobile device is within a zone predefined by the service provider as corresponding with the fixed line device.

12. The method of claim 11 further comprising:
the zone predefined by the service provider comprises a home zone representing an area surrounding a home phone of the user.

13. A method comprising:
receiving a call attempt to a fixed line device of a user;
identifying a location of a mobile device of the user;
determining if the mobile device is located in a zone predefined as corresponding with the fixed line device;
applying call forwarding of the call attempt from the fixed line device to the mobile device if the mobile device is located in the predefined zone;
identifying a fixed line tariff for the call;
identifying a mobile tariff for the call;
initiating charging for the call based on a combination of the fixed line tariff and the mobile tariff to spread charging across directory numbers for the fixed line device and the mobile device;
while the call is in progress, identifying that the mobile device moves from the predefined zone to another zone; and
switching charging to the mobile tariff.

14. The method of claim 13 further comprising:
waiting a threshold time period after the mobile device leaves the predefined zone before switching the charging to the mobile tariff.

15. The method of claim 13 further comprising:
sending a notification to the mobile device indicating that tariff is changing.

16. The method of claim 15 wherein:
the notification to the mobile device comprises a text message.

\* \* \* \* \*